United States Patent [19]
Van Romer

[11] Patent Number: 5,800,091
[45] Date of Patent: Sep. 1, 1998

[54] CONFIGURABLE CONTAINMENT SYSTEM AND WALL STRIP

[76] Inventor: Edward W. Van Romer, 1018 Arrowhead Point, Anderson, S.C. 29625

[21] Appl. No.: 592,558

[22] Filed: Jan. 26, 1996

[51] Int. Cl.⁶ .................................................. F02B 7/00
[52] U.S. Cl. ................... 405/52; 220/573; 220/666; 220/9.2
[58] Field of Search ........................ 405/25, 52, 21, 405/128, 129; 588/249, 259; 210/571, 573, 9.2, 9.1, 9.3, 666, 676, 405, 731

[56] References Cited

U.S. PATENT DOCUMENTS

| | | | |
|---|---|---|---|
| 935,278 | 9/1909 | Smyth | 220/573 X |
| 4,031,676 | 6/1977 | Dally | 52/102 |
| 4,765,775 | 8/1988 | Krogar | 405/52 X |
| 4,981,391 | 1/1991 | Klementovich | 405/52 |
| 5,090,588 | 2/1992 | Van Romer et al. | 220/573 |
| 5,099,872 | 3/1992 | Tarvin et al. | 220/573 X |
| 5,128,189 | 7/1992 | Bartlett | 428/71 |
| 5,158,395 | 10/1992 | Holmberg | 405/21 |
| 5,236,281 | 8/1993 | Middleton | 405/114 |
| 5,405,217 | 4/1995 | Dias et al. | 405/25 |
| 5,423,339 | 6/1995 | Latimer | 220/573 X |
| 5,462,655 | 10/1995 | Ladd et al. | 405/52 X |
| 5,511,683 | 4/1996 | Dailey | 220/573 |

*Primary Examiner*—Tamara L. Graysay
*Assistant Examiner*—Frederick L. Lagman
*Attorney, Agent, or Firm*—Henry S. Jaudon; Cort Flint

[57] ABSTRACT

A containment wall strip composed of a pliable, severable material which may be cut into selected lengths for defining a containment area for containing hazardous materials. The containment wall strip includes a base and a free standing deformable berm wall which extends upward from the base. An open channel space is defined between the berm wall and base enabling the free standing berm wall to deform downward enabling wheeled vehicles to enter and exit the containment area.

18 Claims, 4 Drawing Sheets

CONFIGURABLE CONTAINMENT SYSTEM AND WALL STRIP

BACKGROUND OF THE INVENTION

This invention relates to containment devices in general, and more particularly to a containment wall strip which may be tailored for use in the field in a quick and easy manner for forming a containment barrier of a desired size for containing hazardous liquid chemical spills and the like which will also deflect to a generally flat profile permitting wheeled vehicles to easily enter and exit the contained area.

The potential for a liquid chemical spill exists wherever chemicals are used. A chemical spill may occur inside a factory from machines leaking oil and the like or from storage tanks leaking and rupturing. Chemical spills may also occur outdoors during the fueling of aircraft or vehicles, or when vehicles containing chemical residue are washed. If left uncontained, the liquid spill will spread over a large area creating a hazardous work environment for individuals and possibly damaging equipment. If the spill occurs outdoors, the spill may contaminate ground water sources. Accordingly, it is desirable to contain the spill to minimize damage and also to facilitate clean up.

Various means have been developed for containing chemical spills. At areas where fuel trucks are washed, concrete dams are generally erected for defining containment areas. Also, it is common to dig trenches around chemical storage sites for containing the chemicals should the storage tanks rupture. Both of these containment means are expensive to construct and are permanently fixed. Another means for containing spills includes erecting earth mounds known as earth berms around an area and covering the mounds and encircled area with polyurethane.

Since chemical spills may occur anywhere and in any size, it is desirable that a containment device be portable and readily configured to any size. Also, since many spills occur in factories, the containment device should be durable and readily configurable for placement around machines or chemical storage areas of various sizes.

Some portable containment devices having integral floors and walls of various arrangements have been developed and are shown in U.S. Pat. Nos. 5,090,588 and 5,128,189. While these devices are satisfactory for their intended purpose, they are not designed to be placed underneath immobile objects such as machines which are already attached to floors. These containments include a floor attached to walls which define a fixed container and are not configurable nor designed to be modified to contain spills of various sizes. Placement of these containments underneath leaking machines or storage drums would be dangerous to the individual attempting to place the containment or difficult to achieve due to the immobile nature of machines and storage drums.

Furthermore, the contained area must be accessible by wheeled vehicles. This is required since the machines in their daily use require maintenance and replacement parts. Dollies and tool carts must be allowed to enter the contained area so that maintenance may be performed on the machines. Also, if the contained area is a holding area for chemical storage drums, the chemical drums are generally transported using lift trucks which must be allowed to enter the contained area for placing the chemical drum within the contained area.

Another containment device which is a dam is disclosed in U.S. Pat. No. 5,236,281. This dam is of a solid construction molded from polyurethane which makes the dam expensive to manufacture. Also, the solid construction of the dam prevents the dam from conforming to irregularities commonly found in factory floors such as cracks and bumps. Consequently, the dam may not rest flush against the factory floor and the hazardous spill may be able to seep underneath the dam and become uncontained. Furthermore, the dam's solid construction acts as a barrier with respect to wheeled vehicles and impedes the transporting of wheeled vehicles into the contained area. Thus, lift trucks carrying chemical storage drums are either prevented from entering the chemical storage area or require precarious maneuvering over the solid dam creating a hazardous situation whereby the chemical storage drum may fall off of the lift truck as the lift truck is tilted upwards and downwards over the solid barrier.

Another dam is disclosed in U.S. Pat. No. 4,031,676. This dam is similar to the one disclosed in U.S. Pat. No. 5,236,281 but uses suction cups for attachment to the ground. This dam will only function where the overall surface area is relatively smooth which is uncommon at factory sites and also acts as a barrier restricting access of wheeled vehicles into the contained area.

Accordingly, it is an object of the present invention to provide a portable containment device which is easily tailored to a desired size on site to create a containment barrier;

It is also another object of the present invention to provide a portable containment device which may contain hazardous chemical spills while enabling wheeled vehicles to enter the contained site;

Also, it is an object of the present invention to provide a portable containment device which may contain hazardous chemical spills and provide a path for disposing of the chemical spill through the use of a vacuum, pump or the like;

Furthermore, it is an object of the present invention to provide a containment device which is flexible and may be secured to the ground creating a sealed containment area which may contain hazardous chemical spills.

SUMMARY OF THE INVENTION

The above objectives are accomplished according to the present invention by providing a containment system which may be configured on site for surrounding and containing hazardous chemicals. This containment system comprises at least one length of a containment wall strip which has a first and second end and is constructed from a pliable, severable material so that the strip may be cut into selected lengths for placement on the ground at the site for creating a containment barrier. An elongated flattened, pliable base is also included in the containment wall strip. A free standing berm wall is carried by the base which extends upward and longitudinally along the base for creating the containment barrier. The berm wall is flexible and has an upright configuration for containing the hazardous materials within the containment barrier. The berm wall is deformable to a generally flat position enabling wheeled vehicles to enter and exit the containment area. An open channel space is defined between the free standing berm wall and the base so that the free standing berm wall may deform to a deformed position. A support is carried within the open channel and is engaged by the berm wall to maintain the deformed berm wall at an effective spill-retaining height above the base. A wall joint is configured between the opposing sides of the containment wall strip for adjoining the lengths of the containment wall strip to form the containment barrier.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
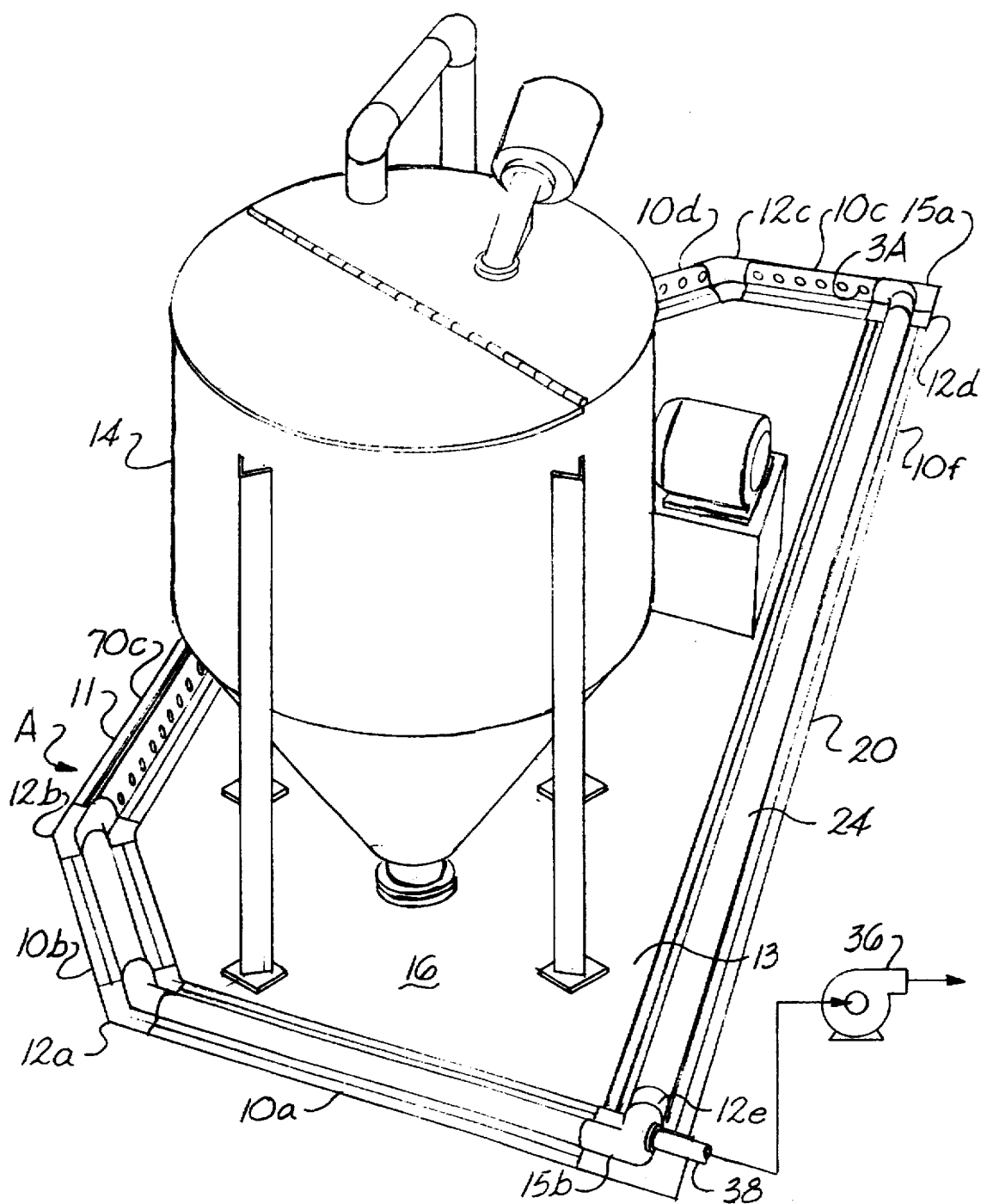
FIG. 1 illustrates a perspective view of a configurable containment wall strip according to the invention which has been cut and configured to form a containment barrier around a chemical storage tank for containing a chemical spill.
Figure 6:
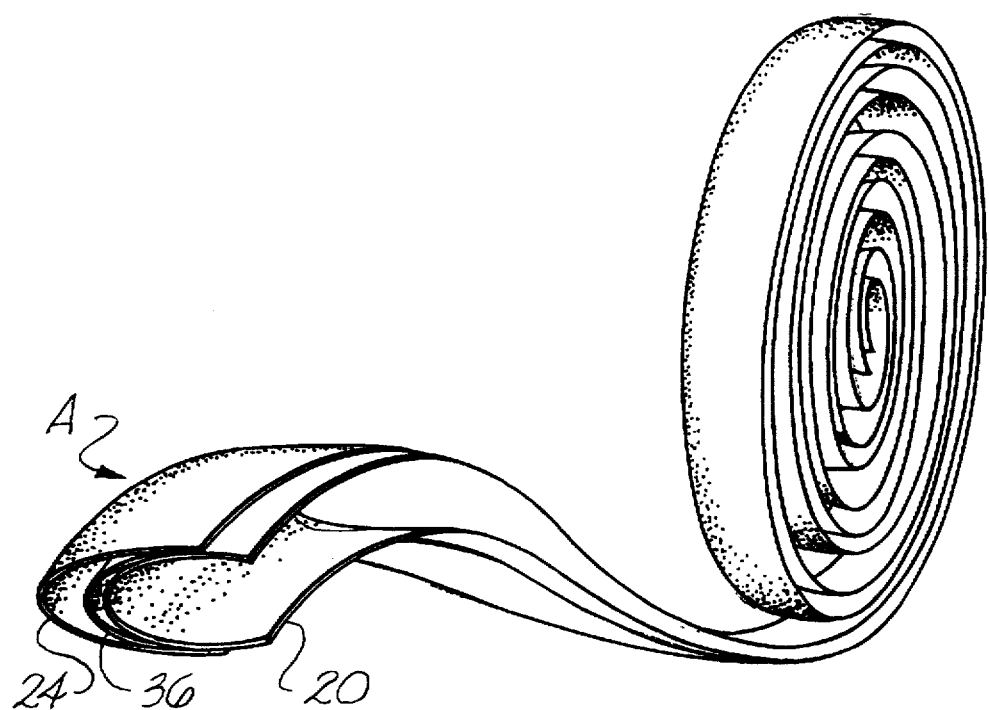
FIG. 6 is a perspective view of the wall formed into a roll.

Referring now in more detail to the drawings, as can best be seen in FIGS. 1 and 6, containment wall strip A is constructed from pliable, severable material which may be cut into selected lengths for creating a tailored containment wall 11 at a site to enclose a containment area in which hazardous materials may be contained. As shown in FIG. 1, containment wall strip A has been sectioned into six separate wall lengths 10a through 10f which have been joined by joints 12b and 12e around chemical storage bin 14 and attached to floor 13 of the site to define containment area B for containing a chemical spill which may occur from chemical storage bin 14. If the footprint of a machine or storage bin is known prior to its permanent placement at the site, then containment base sheet 16 may be cut to size and attached to floor 13 with wall lengths 10a through 10f attached to containment base sheet 16. Containment base sheet 16 may also be used for outdoor configurations providing a floor so that the hazardous chemicals will not permeate into the ground.

As shown in FIG. 6, containment wall strip A is flexible and may be folded and provided in rolls of various lengths depending on the need. For example, a berm around a fuel truck may be three hundred feet in length. For creating the berm, the containment wall strip A is laid out at the site and cut for defining containment wall 11.

Figure 2:
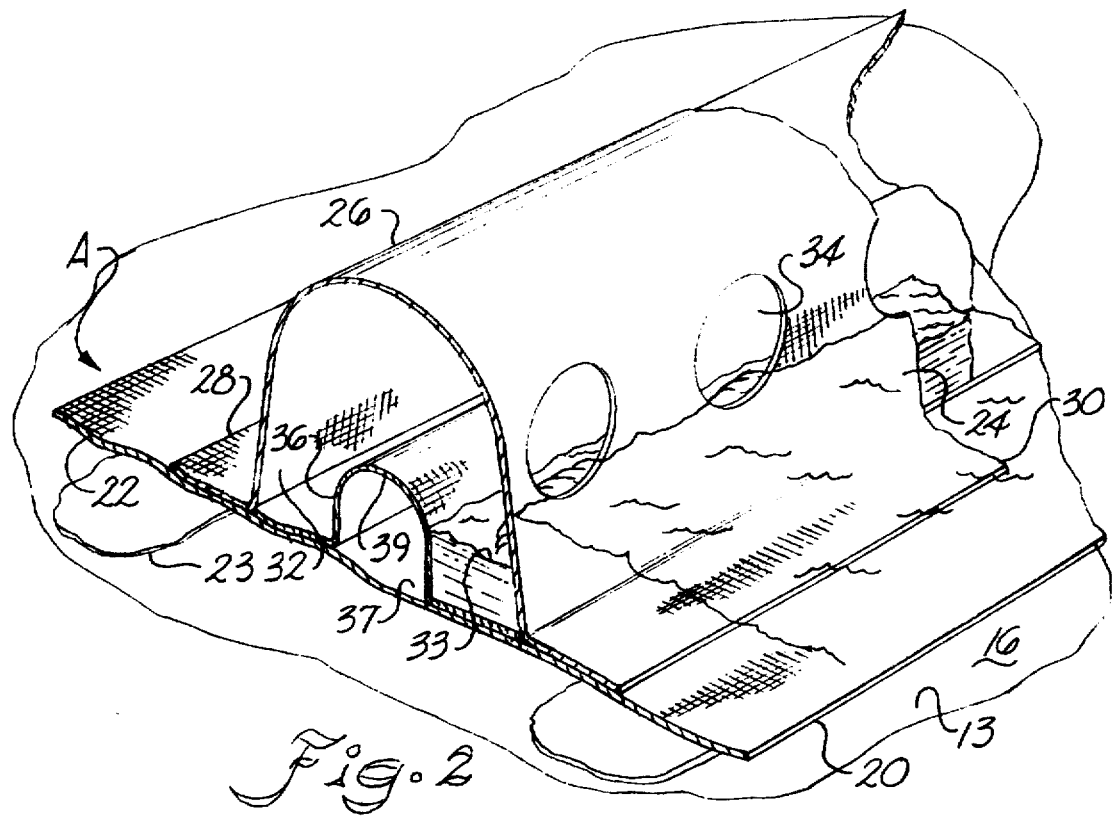
FIG. 2 illustrates a cut-away portion of a section of the containment wall strip according to the invention.

As shown in FIGS. 1 and 2, containment wall strip A includes an elongated flattened, pliable base 20 which is secured either to site floor 13 or containment base sheet 16 for sealing containment wall strip A in a configurable configuration. Base 20 and containment base sheet 16 are preferably made from a sheet material sold by Seamans of Wooster, Ohio. The base sheet consists of a support fabric 22 which has been permeated with a non-absorbent synthetic material such as a barrier film material which is capable of providing impervious properties to the sheet material. Such barrier film materials include but are not limited to thermoplastic materials. The support fabric is either woven, knitted or braided which provides the sheet with strength and durability and also resiliency. The barrier film material used for sealing support fabric 22 will vary depending on the intended application of containment wall strip A. For instance, polyurethane will be used as the barrier film material when the containment wall strip will be used for containing certain chemicals which may be strong solvents. Vinyl is used if acidic products or mild solvents are to be contained. The preferred sheets supplied by Seamans are designated as 1932 PTF for the polyurethane sheet and XR5 for the vinyl sheet. The pliable nature of the base sheet enables the sheet to conform to the unevenness of the site surface which may result from cracks or perforations in the surface. Base 20 is placed on the ground and adhered to the surface by using a silicone sealant 23. In the preferred embodiment, the sealant is manufactured by Dow Corning of Midland, Mich. having a product number 790 or 795. The combination of the pliable sheet with the sealant provides for a continuous seal of wall strip A along the periphery of containment area B. In the event that containment base sheet 16 is used to form a designated footprint, then containment base sheet 16 will be sealed to floor 13 preferably by sealant 23.

Also shown in FIGS. 1, 2, 3, and 4 an elongated free standing berm wall 24 is carried by base 20 and extends upward and longitudinally along base 20 for defining a vertical wall around the periphery of containment area B. In the preferred embodiment, berm wall 24 is also manufactured from a sheet material having a support fabric permeated with a barrier film material supplied by Seamans. The sheet material provides berm wall 24 with resilient characteristics which will be defined hereinafter. Joints 12 are also made of the same sheet material as the base sheet and berm wall. Joints 12 are small pieces of sheet material which are positioned over two abutting lengths of wall strip A for sealing the two adjacent pieces together.

As shown in FIG. 1, corner elements 15a and 15b are used for right angles. Corner elements 15a and 15b are of the same construction as containment wall strip A with a bend defined within the berm wall and support wall and attached by joints 12.

As shown in FIG. 2, berm wall 24 includes an arcuate top portion 26 which is disposed intermediary first berm attachment leg 28 and second berm attachment leg 30 which attaches berm wall 24 to base 20. Arcuate top portion 26 is supported by first berm attachment leg 28 and second berm attachment leg 30. In the preferred embodiment, first berm attachment leg 28 and second berm attachment leg 30 are approximately three inches wide. The three inch span of the arcuate top portion 26 combined with the resilient nature of the sheet material of berm wall 24 enables arcuate top portion 26 to flex downward to a generally flat profile enabling wheeled vehicles to pass over berm wall 24 as will be described hereinafter. In the preferred embodiment, berm attachment legs 28 and 30 are attached to base sheet 20 at right angles by heat sealing. They may also be attached by an adhesive. Open channel space 32 is defined by the offset of berm wall 24 from base 20 which will be used as a pathway for evacuating liquid chemicals contained within the containment area. Open channel space 32 also provides a space for berm wall 24 to deflect downward when wheeled vehicles pass over the berm wall. Flow ports 34 are defined along the surface of berm wall 24 which will be positioned inwardly as shown in FIG. 1 facing the interior of the containment area providing a path for the spilled chemicals to flow from the interior of the containment area into open channel space 32.

Figure 4:
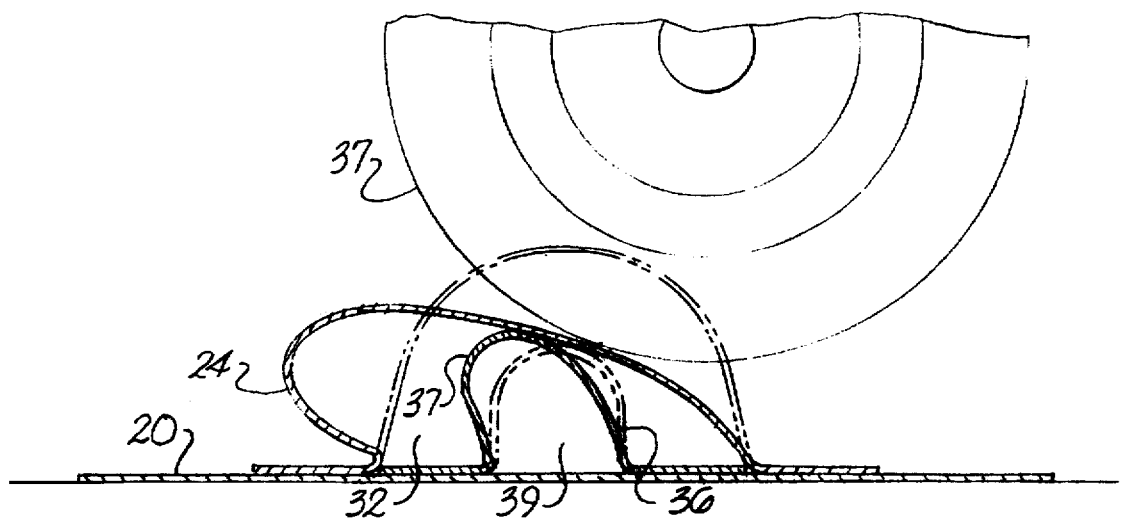
FIG. 4 illustrates a perspective view taken along line 4—4 of FIG. 3 illustrating the containment wall strip deforming and enabling the wheeled vehicle to pass over the berm wall while maintaining a minimum height for retaining liquid within the interior of the containment.

As shown in FIG. 1, pump 36 is connected to open channel space 32 through pump attachment 38 which will cuate the spilled liquid chemical providing a safe and
y cleanup of the spilled chemical. As shown in FIG. 2,
uid chemical spill 33 is contained within containment area
and flows through flow parts 34 into open channel space As shown in FIGS. 2 and 4, arcuate hollow support 36 is
ried by base 20 within open channel space 32. In the
ferred embodiment, arcuate hollow support 36 is also
de from the pliable sheet material manufactured by
means as used for berm wall 24. Arcuate hollow support
also has an arcuate top portion 37. Arcuate top portion 37
supported by first support leg 52 and second support leg
In the preferred embodiment, first and second support
s 52 and 54 are approximately one inch wide and arcuate
portion 37 spans approximately one inch across. Since
port 36 has a smaller span size than berm wall 24,
port 36 is more rigid than berm wall 24. Support channel
is defined between arcuate top portion 37 and base 20. In
preferred embodiment, arcuate hollow support 36 is
ced approximately an inch from the internal surface area
berm wall 24 within open channel space 32.

Figure 3:
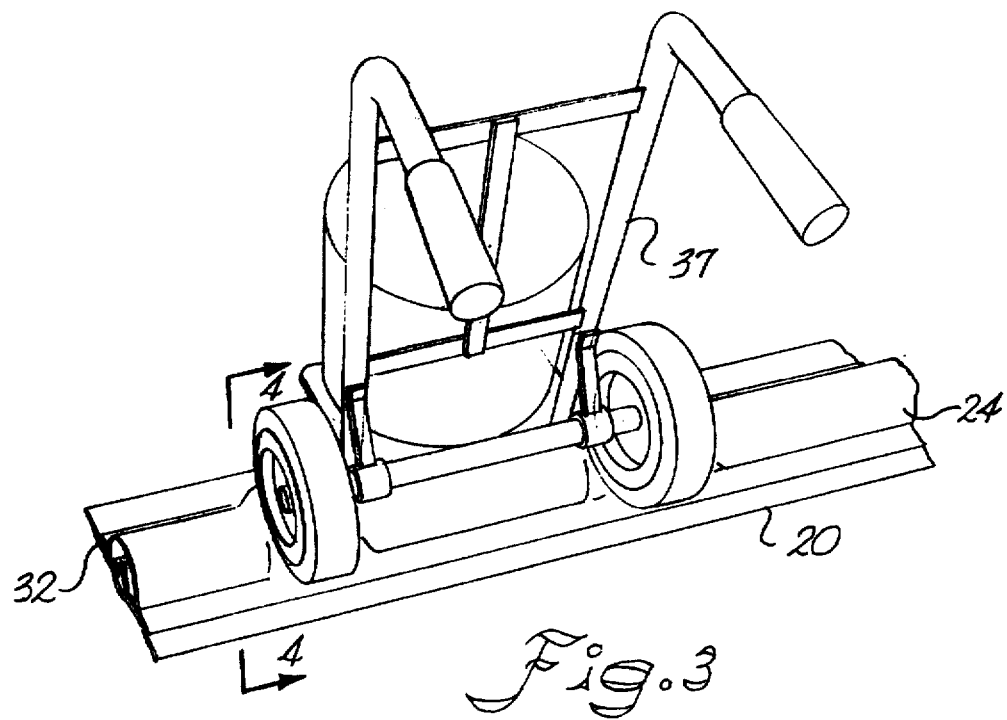
FIG. 3 illustrates a perspective of a segment of the containment wall strip deforming and enabling a wheeled vehicle to pass over the berm wall.

As can be seen in FIGS. 2, 3, and 4, berm wall 24 has an
ight configuration and a deformable configuration in
ich the berm wall is deformed into a semi-flattened
ition enabling wheeled vehicle such as dolly 37 to enter
l exit into the containment area. The flexible arcuate top
tion 26 of berm wall 24 facilitates the deforming of berm
ll 24 as the wheeled vehicle passes over the berm wall. As
ly 37 passes over berm wall 24, berm wall 24 flattens to
generally flat profile as the pressure is applied to the
uate top portion 26 of berm wall 24. By collapsing
nward, pressure on berm wall 24 is transferred along the
uate surface of berm wall 24 at the contact point with the
eeled vehicle. Accordingly, the weight and force of the
eeled vehicle is transferred generally over the entire
gth of the berm wall as the wheeled vehicle passes and
s not focus on a single leverage point which would
ntually weaken the berm wall.

As shown in FIG. 4, berm wall 24 deforms downward
il berm wall 24 engages arcuate hollow support 36.
uate hollow support 36 is also resilient and the arcuate
face may also deform to facilitate the deforming of berm
ll 24. Support channel 39 provides arcuate hollow support
with an area for deforming. As berm wall 24 deforms
nward to a generally flat profile, arcuate hollow support
maintains berm wall 24 at a minimum height and berm
ll 24 folds onto itself thereby maintaining berm wall 24
ve base 20 maintaining an effective vertical height for
taining a spill when deformed. Arcuate hollow support
is more rigid than berm wall 24 due to the smaller span
e of the arcuate top portion of arcuate hollow support 36.
h the smaller span, the downward force on the arcuate
low support 36 is transferred to the vertical support legs
intaining support 36 upright as berm wall 24 continues
ing along its arcuate top portion. Berm wall 24 continues
ing as the weight of the wheeled vehicle passes over
port 36 until first support leg folds onto itself. The
lient nature of berm wall 24 in combination with the
re rigid arcuate hollow support 36 returns berm wall 24
ts upright configuration after the weight of the wheeled
icle has been removed thereby maintaining the vertical
ght of the berm wall.

As shown in FIG. 2, in the preferred embodiment, flow
ts 34 are defined within berm wall 24 permitting access
the fluid contained in the interior of containment area to
v into open channel space 32. Flow ports 34 are posi-
ied along berm wall 24 at a desired height above base
sheet 20 so that berm wall 24 will not tear as wheeled
vehicles pass over the berm wall. Flow ports 34 are placed
in a position whereby an accumulation of fluid within the
containment area would flow into open channel space 32.

As can be seen in FIGS. 1 and 6, a containment system for
creating a tailored containment border on site enclosing a
containment area is illustrated. At least one containment
wall strip A having first end 40 and second end 42, which is
initially packaged in a roll, is unrolled and cut into selected
sections which are joined together by joints 12 to define
containment wall 11. Perspective ends of sectioned lengths
of containment wall strip A are abutted together and joint 12
is placed over the abutting edges and sealed to base 20
securing the two lengths together. Joint 12 is a small piece
of sheet material which is wrapped over the top portion of
the adjacent base sheets and berm walls and adhered to the
respective surfaces. In the preferred embodiment, the adhe-
sive is manufactured by R.H. Products Co., Inc. of Acton,
Mass. having a product number of HH66 which is a vinyl
cement. If containment base sheet 16 is used, containment
wall strip 12 is sealed to containment base sheet 16 either by
heat sealing or by using an adhesive.

Figure 5:
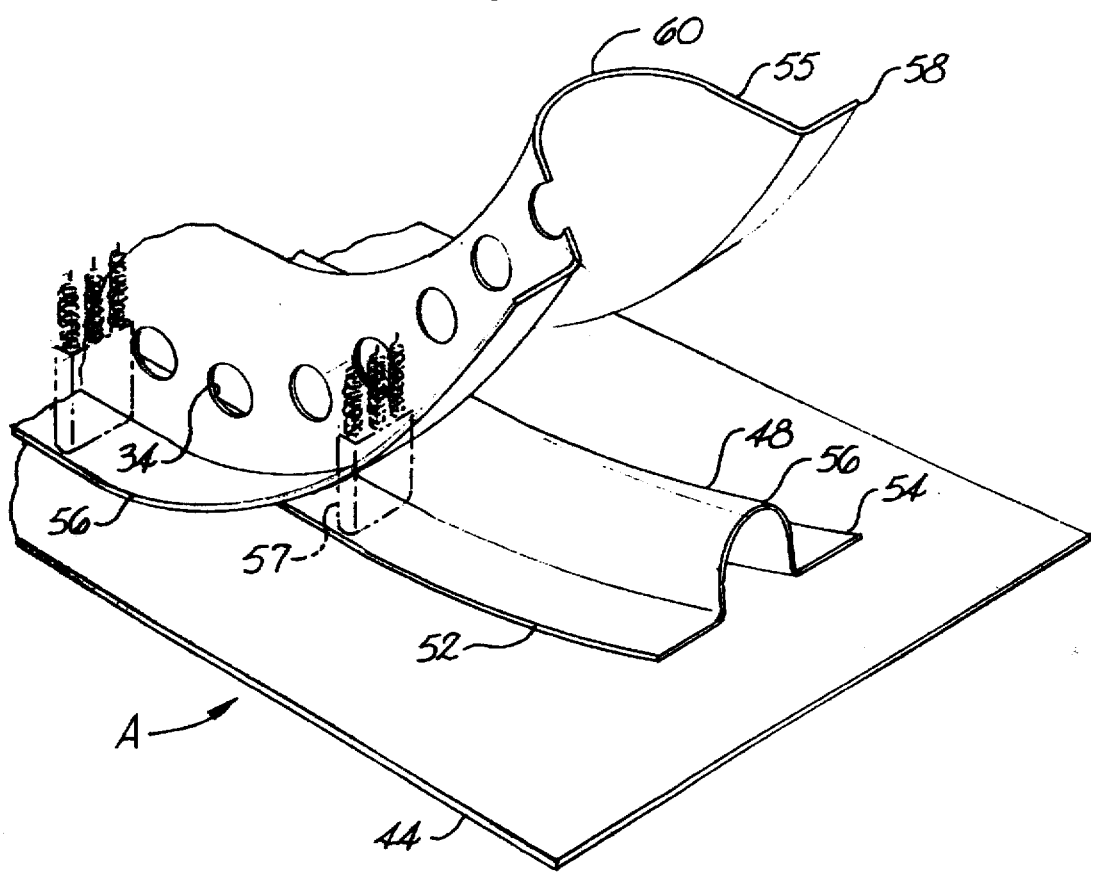
FIG. 5 illustrates a perspective view of the manufacturing of a configurable containment wall strip according to the invention.

As can be seen in FIG. 5, a method for manufacturing the
continuous length containment wall strip A is illustrated.
Continuous length base sheet 44 is provided and a continu-
ous length berm support sheet 48 is provided for attaching
to base sheet 44. Support sheet 48 is creased to define first
support attachment leg 52 and second support attachment
leg 54 on opposite ends of berm support sheet 48 with
support wall 56 disposed between first and second support
attachment legs. Support sheet 48 is placed along the length
of base sheet 44 and is attached by heat sealing, using heat
source 57, first and second support legs 52 and 54 to base
sheet 44. Approximately three thousand pounds of pressure
is directly applied to first support attachment leg and heat
sealed. Then the process is repeated for attaching the second
support attachment leg. Alternative methods may be used
such as heat sealing both legs simultaneously or utilizing an
adhesive for attaching the first and second attachment legs.
Once support sheet 48 is secured to base sheet 44, a
continuous length of berm sheet 55, which is also severable,
is provided and creased to define first berm attachment leg
56 and second berm attachment leg 58 with berm wall 60
extending upward between the first and second berm attach-
ment legs. Berm sheet 55 is longer than support sheet 48 so
that berm wall 60 may be positioned over support wall 56
and spaced from support wall 56 approximately one inch
around support wall 56. Once berm sheet 55 has been
creased, first and second berm attachment legs 56 and 58 are
attached to base sheet 44 by the same method as attaching
support sheet 46 to base sheet 44 forming channel 36. In the
preferred embodiment, flow ports 34 are defined within the
wall of berm sheet 55 for enabling liquid flow to flow into
channel 36.

In use, as shown in FIGS. 1, 2 and 6, containment wall
strip A may be flattened for rolling up and transporting to a
desired location. When a chemical spill has occurred or in an
area where a chemical spill is likely to occur, the continuous
length of berm sheet may be cut and configured into any
desired configuration around the hazardous situation and
sealed to the floor of the site or containment base sheet
thereby containing any fluid which may leak from the area.
The lengths of the containment wall may be cut into angles
and adjoined by joints. Corner elements may be used for
right angles.

While a preferred embodiment of the invention has been
described using specific terms, such description is for illustrative purposes only, and it is to be understood that changes and variations may be made without departing from the spirit or scope of the following claims.

What is claimed is:

1. A containment system which may be configured on site for surrounding and containing hazardous materials comprising:

a containment wall strip having a first end and a second end, and said wall strip being constructed from a pliable, severable material so that said strip may be cut into selected lengths for placement on the ground at the site for creating a containment barrier;

said wall strip including an elongated, flattened, pliable base;

a free standing berm wall secured with said base, said free standing berm wall extending upward and longitudinally along said base creating said containment barrier;

said berm wall being flexible and having an upright configuration in which said berm wall will contain said hazardous materials within said containment barrier and a deformed configuration enabling wheeled vehicles to pass over said berm wall to enter and exit said containment area;

said berm wall defining a deformable open channel space between said free standing berm wall and said base;

a support secured with said base within said open channel space, said support being formed more rigid than said berm wall and being operative to limit deformation of said open channel space thereby maintaining said berm wall always at an effective spill-retaining height above said base.

2. The system of claim 1 including at least one flow port defined within said berm wall communicating with said open channel space permitting liquid contained in said contained area to flow into said open channel space for evacuation.

3. The system of claim 2 including a pump in fluid communication with said open channel space for evacuating said contained liquid.

4. The containment system of claim 1 including a sealant for securing said containment wall strip lengths to the ground providing a seal preventing liquid contained in said contained area to flow underneath said base.

5. The system of claim 1 including a wall joint configured between opposing ends of said containment wall strip for adjoining said lengths of said containment wall strip to form said containment barrier.

6. The system of claim 1 including a flexible flooring sheet covering said sight, said strip being affixed to said flexible flooring sheet.

7. A containment wall strip which may be supplied in continuous lengths for use in creating a tailored containment area on site to contain hazardous materials comprising:

an elongated, flattened, pliable base;

a free standing berm wall attached with a surface of said base, said berm wall extending upward and longitudinally along said base for defining a vertical wall having an open channel space around said containment area;

an upstanding support attached with said base within said open channel space for limiting movement of said berm wall toward said base;

said base, said support barrier and said berm wall being constructed from severable material so that said wall strip may be cut into selected lengths for placement on the floor at the site for forming said containment area;

said berm wall being flexible and having an upright configuration in which said berm wall contains said hazardous materials within said containment barrier and a deformed configuration enabling wheeled vehicles to enter and exit said containment area over said berm wall; and space within said open channel extending between said free standing berm wall and said support defining the extent of downward deformation of said free standing berm wall.

8. The containment wall strip of claim 7 wherein said berm wall has an arcuate top portion spanning over said base.

9. The containment wall strip of claim 8 wherein said support includes a flexible arcuate top portion defined between a first and second support leg which has a smaller span than the span of said arcuate top portion of said berm wall making said support more rigid than said berm wall so that when said berm wall flexes downward, said support maintains said berm wall at said effective vertical height.

10. The containment wall strip of claim 7 wherein said support is formed more rigid than said berm wall.

11. The containment wall strip of claim 7 wherein said base is comprised of a sheet material having a support fabric permeated with a non-absorbent synthetic material.

12. The containment wall strip of claim 11 wherein said support fabric comprises one of a knitted fabric, braided fabric, woven fabric, and entangled yarn; and said support fabric is permeated with a synthetic film former.

13. The containment wall strip of claim 7 wherein said berm wall is comprised of a material having a support fabric permeated with a non-absorbent synthetic film former providing said berm wall with strength.

14. The containment wall strip of claim 7 including at least one flow port defined within said berm wall communicating with said open channel space for permitting liquid contained within said contained area to flow into said open channel space for evacuation.

15. The containment wall strip of claim 7 wherein said strip may be folded about a center of said pliable base and formed into a roll for transportation.

16. A method for forming a containment area from a continuous length-containment wall strip cut into sections and tailored on site to form the periphery of the containment area at a desired size for containing hazardous materials, said method comprising:

providing a continuous length base sheet which is severable having a non porous support fabric;

providing a continuous length non porous, severable and deformable berm sheet;

creasing said berm sheet defining a first attachment leg, a second attachment leg and a berm wall disposed between said first and second berm attachment legs, securing said first and second berm attachment legs with said base sheet forming said berm wall to extend upward from said base sheet and forming a cavity between said base sheet and said berm sheet;

and providing a continuous severable berm support sheet, creasing said berm support sheet defining a first support attachment leg, a second support attachment leg and a support wall disposed between said first and second support attachment legs, attaching said first and second support attachment legs with said base sheet within said cavity with said support sheet extending upward from said base sheet forming a support limiting deformation of said berm wall.

17. The method of claim 16 further including perforating said berm sheet to define at least one flow port for receiving fluid which will be contained within a container defined by said wall strip.

18. The method of claim 1 including providing a flexible flooring sheet and securing said base sheet with said flooring sheet forming a containment unit.

* * * * *